United States Patent [19]

Meissner, deceased et al.

[11] Patent Number: 5,107,260

[45] Date of Patent: Apr. 21, 1992

[54] METHOD AND ARRANGEMENT FOR TRANSMITTING DATA BETWEEN A CENTRAL DATA STATION AND A PLURALITY OF DATA TERMINALS IN A LOCAL AREA NETWORK

[75] Inventors: Holger Meissner, deceased, late of Munich, Fed. Rep. of Germany, by Ursula Meissner, Heir and Legal Representative; Werner Stoerzbach, Martinsried, Fed. Rep. of Germany

[73] Assignee: Siemens Aktiengesellschaft, Munich, Fed. Rep. of Germany

[21] Appl. No.: 482,964

[22] Filed: Feb. 22, 1990

[30] Foreign Application Priority Data

Feb. 24, 1989 [EP] European Pat. Off. ............ 103291

[51] Int. Cl.$^5$ ............................................. H04B 3/00
[52] U.S. Cl. ........................ 340/825.52; 340/825.03; 340/825.15; 370/61
[58] Field of Search .............. 340/825.52, 825.08, 340/825.10, 825.07, 825.15, 825.18, 825.06; 370/56, 59, 63, 64, 85.8, 94.1, 112, 61

[56] References Cited

U.S. PATENT DOCUMENTS

| | | | |
|---|---|---|---|
| 4,675,864 | 6/1987 | Bliek et al. | 370/85.8 |
| 4,726,017 | 2/1988 | Krum et al. | 340/825.08 |
| 4,942,572 | 7/1990 | Picard | 370/85.8 |

FOREIGN PATENT DOCUMENTS

3306942A1  8/1984  Fed. Rep. of Germany .

OTHER PUBLICATIONS

"ZD-A3/2, ein vielseitig einsetzbares Zeitmultiplexsystem fur Test-und Datenubertragung", by Werner Bacher et al., Telcom report 10 (1987) Special pp. 202-206.

"Datennetzabschlussgerate fur Wahl-und Festverbindungen mit Basisbandubertragung", by Reiner Gieck et al., Telcom report 10 (1987) Special pp. 211-217.

"Datenpaketvermittlung und HDLC-Datenubertragungs-Prozedur", Elektronik 1980, No. 7, pp. 64-69 and No. 8, pp. 89-93.

"Datenubertragung"by P. Bocker, vol. 1, pp. 1-4 and pp. 1-5, 1978, Springer-Verlag.

"Kommunikationsrechner des Systems Transdata 960", by Von Wolfgang Baker, Telcom report 1 (1978) pp. 164-169.

Primary Examiner—Donald J. Yusko
Assistant Examiner—Dervis Magistre
Attorney, Agent, or Firm—Hill, Van Santen, Steadman & Simpson

[57] ABSTRACT

Method and arrangement for transmitting data between a central data station and a plurality of data terminal equipment in a local area network. In order to achieve fast data transmission for simultaneous data lines in a local area network between a central data station and a plurality of data terminals upon interposition of a network node, whereby the known HDLC (high level data link control) data transmission procedure is combined with a data transmission method for data transmission wherein every status change of the binary coded data has a transmission pulse alternating in operational sign allocated to it, a concentrator is utilized as the network node. This concentrator regenerates the incoming HDLC data packet and then transparently forwards them to their desination.

12 Claims, 1 Drawing Sheet

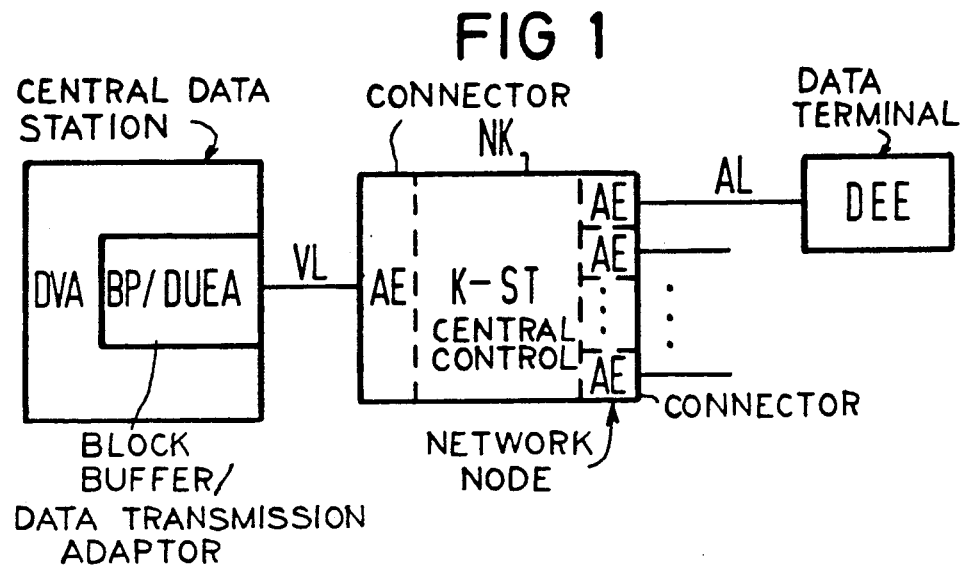

METHOD AND ARRANGEMENT FOR TRANSMITTING DATA BETWEEN A CENTRAL DATA STATION AND A PLURALITY OF DATA TERMINALS IN A LOCAL AREA NETWORK

BACKGROUND OF THE INVENTION

The present invention is directed to a method and apparatus for transmitting data between a central data station and a plurality of data terminals in a local area network.

The present method is directed to the transmission of binary coded data between a central data station and a plurality of data terminals in a local area network utilizing a network node connected to a means for input/output signal processing in the central data station, whereby the data transmission occurs with a standardized data transmission procedure wherein the address of one data terminal of the plurality of data terminals is contained in the transmitted data and every data terminal only transmits data after being called by the central data station, and whereby the data transmission also occurs with a given data transmission method from a group of base band transmission methods.

It is well know to establish data connection via network nodes in order to eliminate transmission lines and transmission equipment. For example, network nodes can be fashioned as interface multipliers or as concentrators. Via these network nodes, the terminal lines of an individual data terminal can be connected to a common connecting line that is connected to a central data station, for example a data processing system.

Interface multipliers are used in non-switchable network nodes wherein signals from a single interface at a first side are routed to a plurality of interfaces at a second side and the signals in the reverse direction are routed from the individual interfaces of the second side to the single interface at the first side. Concentrators are used in switchable network nodes and have controlled equipment for connection set-up and always produce only one data-transmissive path between a data terminal and the central data station. In both instances, data transmission equipment of different types can be connected at both sides of the network node, so that the form of transmission on the individual transmission sections is freely selectable. Previously known arrangements for transmitting data between a central data station and a plurality of data terminal equipment, particularly using a concentrator, use different forms for the data transmission on the different transmission sections. The concentrator therefore establishes mutual matching for the different data transmission forms. The matching, however, causes a considerable reduction in the data transmission rate. Moreover, the concentrators are extremely complex in structure and in terms of their control.

The form of data transmission is composed of a data transmission procedure and a data transmission method. The data transmission procedure specifies the method and the rules for the chronological sequence of data exchange between the communicating partners. The data transmission method indicates how different coding characters are physically transmitted on the lines, i.e., which pulse shapes and, potentially, which modulation is selected for the transmission of the data signals.

For example, one known data transmission procedure is the standardized data transmission procedure HDLC (high level data link control) that, for example, is described in Elektronik, 1980, No. 7, pages 64–69 and No. 8, pages 89–93. The HDLC data transmission procedure is distinguished by high data transmission reliability and can be easily used in combination with the above-cited, switchable network nodes and with data stations that are capable of utilizing the HDLC procedure.

For example, bipolar or AMI (alternate mark conversion) methods are two of many known data transmission methods, and belong to a group of base band transmission methods described in the book by P. Bocker, Datenuebertragung, Volume 1, pages 1–4 and 1–5, 1978, Springer-Verlag. In this data transmission method, the binary 0 of binary coded data has a transmission pulse 0 allocated to it and the binary 1 has a transmission pulse $+A$ or $-A$ allocated to it in alternation.

It is known that for data transmission the HDLC data transmission can be combined with the AMI data transmission method, but only in the context that either the individual data terminals are directly connected to the central data station or, if a network node is interposed, a different data transmission form is used after the network node. In the former instance, only relatively short distances between the central data station and the data terminal are feasible; whereas, in the second case, the aforementioned disadvantages exist when different data transmission forms are used on different transmission sections. When greater distances exist between the central data station and the data terminals, then modems are necessary, which means an additional outlay. At the same time, the line requirement is greatly increased since every terminal line is individually lengthened.

SUMMARY OF THE INVENTION

It is therefore an object of the present invention to provide a method and apparatus of the type initially cited such that fast and more distance-independent data transmission is possible in the local area network.

This object is achieved by a method which has the steps of: using the same data transmission method for the data transmission preceding and following the network node; regenerating and intermediately storing the data in the network node; checking the data with reference to a co-supplied control code; and setting a data through-connection path dependent on the destination address contained in the data.

The system for transmitting binary coded data between the central data station and the plurality of data terminals in the local area network includes a network node connected to a means for input/output signal processing in the central data station. The network node is switchable and uses the same data transmission method both in the direction toward the data processing system as well as in the direction toward the data terminals. The network node has a set of first connector units that prevent any occurrence of modulation products in a transmission direction and that shapes pulses and suppresses noise signals in a reception direction. The first connector units are respectively connected to connecting lines. The network node also has a second connector unit connected to the central data station and a first data transmission control unit adapted to the data transmission method. The first connector units are connected via a controllable selection switch to a second data transmission control unit adapted to the same data transmission method. Each of the first and second data transmission control units are connected to a common, serial interface control circuit and to a common clock generator. The network node also has a microprocessor unit with an integrated buffer memory connected to the first and second data transmission control units as well as to the serial interface control circuit and to the controllable selection switch.

A means for switching is provided for setting different operating conditions of the network node. The means for switching is connected at least to the first and second data transmission control units, the serial interface control circuit and the controllable selection switch. The means for switching can be manually operable or can be controlled via the microprocessor unit. In accordance therewith, an involved and time-consuming matching of different data transmission forms at both sides of the network node is eliminated. The data to be transmitted is regenerated in the network node and can thus be again transmitted over a great distance without additional modems. The multiplexer function of the network node combines lines and, thus, eliminates the need for a large number of lines. A separate clock generator in the network node also makes clock lines leading to it unnecessary.

Although German patent 33 06 942 already discloses a similar arrangement, this system uses an interface multiplier as a network node that, as initially cited, operates on a different principle. Moreover, the interface multiplier is connected to the central data station or to the data terminal via more than 2-wire interface lines, so that this multiplier cannot be operated via symmetrical double wires, for example a telephone line.

Set forth below are several advantageous developments of the present invention. For example, one of these developments is that the network node has a switch means with which different operating conditions can be set in the network node.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 general block diagram of the present invention; and

FIG. 2 is a more detailed block diagram of a network node used in the FIG. 1 diagram.

DESCRIPTION OF THE PREFERRED EMBODIMENT

The block diagram of FIG. 1 shows an arrangement for transmitting data between a central data station DVA and a plurality of data terminals DEE in a local area using a network node NK functioning as a concentrator. The central data station DVA has a block buffer BP and a data transmission adaptor DUEA that are connected to the network node NK via a connecting line VL. The block buffer BP operates as an input/output means (also referred to as a means for input/output signal processing) based on the HDLC data transmission procedure in the central data station DVA, as is known, for example, from Telecom Report 1 (1978), No. 3, pages 164–169. The data transmission adaptor DUEA converts the digital input/output signals of the block buffer BP into analog transmission signals on the connecting line VL, whereby every status change of the binary coded data in the selected data transmission method has a transmission pulse allocated to it that alternates in operational sign. Via terminal lines AL, the data terminals DEE are connected to the network node NK. The network node NK has a central control part K-ST and a plurality of connector units AE. The connector units AE are the input/output units of the network node NK. One connector unit AE is provided for each connectable data terminal equipment DEE and for the central data station DVA. In this respect, the connecting line VL is connected to a connector unit AE at the one side of the network node NK, whereas the terminal lines AL of the individual data terminal equipment DEE are respectively connected to a terminal unit AE at the other side of the network node NK. The connecting line VL as well as the terminal lines AL have symmetrical double wires, for example, the wires of a telephone line.

FIG. 2 sets forth the internal structure of the network node NK. As already described, the connecting lines VL as well as the terminal lines AL are each respectively connected to a connector unit AE. As is the case for all other components of the network node NK the connector units AE are designed for the HDLC data transmission procedure and for the selected data transmission method. With respect thereto, the connector units AE for incoming data, which are designed for bidirectional data traffic, each have known receiver filters with a following receiver or, respectively, have known transmission filters with a preceding transmitter for outgoing data. The transmission filters prevent the formation of modulation products and the receiver filters improve the pulse pattern of the incoming data and free it of superimposed disturbances.

The connector unit AE located on the side of the central data station DVA is connected to a bidirectionally operating, first data transmission control unit DUE1 that performs an analog-to-digital conversion on the signals sent by the connector unit AE and regenerates the original, digital signals. In the reverse direction, it carries out a digital-to-analog conversion with respect to data transmitted in the direction of the central data station DVA. The first data transmission control unit DUE1 is also connected to a known, serial interface control circuit SCC that coordinates data traffic from or, respectively, to the various, connected units in the network node NK. In the direction of the data terminals DEE, the serial interface control circuit SCC is then followed by a second data transmission control unit DUE2 that, in a reverse sequence, operates analogous to the first data transmission unit DUE1. This means, for example, that data sent from the central data station DVA to a data terminal DEE is first analog-to-digitally converted by the first data transmission control unit DUE1 and subsequently digital-to-analogly converted by the second data transmission control unit DUE2.

A controllable selection switch MUX that establishes the respective data path to an appertaining data terminal DEE is located between the second data transmission control unit DUE2 and the individual connector units AE for the data terminals.

First and second data transmission control units DUE1 and DUE2 are driven by a common clock generator TG that supplies the clocks needed for the processing. Both data transmission control units DUE1 and DUE2 operate from the same fundamental clock. The serial interface control circuit SCC receives clock signals T, required for transmitting and receiving data D, from one of the two data transmission control units DUE1 and DUE2.

The control executions sequencing in the network node NK are controlled by a microprocessor unit MP that is connected to the two data transmission control units DUE1 and DUE2 as well as to the serial interface control circuit SCC and to the controllable selection switch MUX.

A switch means S with which the various operating conditions in the network NK can be set can also be provided in the network node NK. For example, various data transmission rates can be set in the direction toward the data terminals or a setting can be made such that data intended for a plurality of data terminals DEE are output via one and the same connector unit AE. A further network node in the form of a concentrator can then be connected to the appertaining connecting unit AE, this further network node forwarding the data to the combined data terminals DEE. As a result of this cascading, the line requirement can be further reduced and the distance between a data terminal DEE and the data processing system DVA can be increased.

The switch means S can be manually adjustable or can be adjustable via the microprocessor MP (depicted in FIG. 2 by line SL). The following execution then results for the data transmission between the central data station DVA and the data terminal equipment; both in the direction toward the data terminals DEE as well as in the direction toward the central data station DVA, the data transmission occurs according to the HDLC data transmission procedure and according to the same data transmission method. This means that the network node NK forwards the HDLC data packets received from the central data station DVA transparently to the addressed data terminal DEE. All HDLC data packets received from the connected data terminals DEE are also forwarded unmodified to the central data station DVA. In the selected data transmission method, the binary coded data are transmitted with $\sin^2 x$-shaped pulse signals that have a slight harmonic component and are therefore especially suited for the transmission. The original digital data is regenerated from the pulse sequences incoming at the network node NK and are intermediately stored in the internal memory of the microprocessor unit MP. This is required in order to compensate for clock differences between the transmitting parts of the system and the clock which underlies the network node NK. The data is checked for fault-free data transmission with reference to the control code co-supplied according to the HDLC data transmission procedure. Further, the address of a data terminal DEE contained in the data is identified and the selection switch MUX is correspondingly set. Given the condition that no error previously occurred, the data is then forwarded. However, when an error occurs, the data is not forwarded. If the error is recognized by the data terminal DEE or by the data processing system DVA, then no answer back occurs.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Method for transmitting binary coded data between a central data station and a plurality of data terminals in a local area network and using a network node connected to a means for input/output signal processing in the central data station, the network node having a first side connected to the means for input/output signal processing and a second side connected to the plurality of data terminals, whereby the data transmission occurs with a standardized data transmission procedure wherein at least the address of at least one data terminal of the plurality of data terminals is contained in the transmitted data and every data terminal only transmits data after being called by the central data station, and whereby the data transmission also occurs with a predetermined data transmission method from a group of base band transmission methods, comprising the steps of using the same data transmission method for the data transmission preceding and following the network node; regenerating and intermediately storing the data in the network node; checking the data in the network node with reference to a control code contained in the transmitted data; and setting a data through-connection path dependent on the destination address contained in the data.

2. The method according to claim 1, wherein the data is transmitted with the data transmission method wherein every status change of the binary coded data has at least one transmission pulse with an alternating operational sign allocated to it.

3. The method according to claim 2, wherein the transmission pulses alternating in operational sign are $\sin^2 x$-shaped.

4. The method according to claim 1, wherein the data is forward to the data terminal with the destination address only when no error is identified when checking the data.

5. Arrangement for transmitting binary coded data between a central data station and a plurality of data terminals in a local area network utilizing a network node connected to a means for input/output signal processing in the central data section, whereby the data transmission occurs with a standardized data transmission procedure wherein at least the address of at least one data terminal of the plurality of data terminals is contained in the transmitted data and every data terminal only transmits data after being called by the central data station, and whereby the data transmission also occurs with a predetermined data transmission method from a group of base band transmission methods, comprising the network node being switchable and able to use the same data transmission method both in the direction toward the central data station as well as in the direction toward the data terminals; the network node having a set of first connector units that prevent any occurrence of modulation products in a transmission direction and that shapes pulses and suppresses noise signals in a reception direction, said first connector units respectively connected to connecting lines which are respectively connected to the plurality of data terminals, the network node also having a second connector unit connected to the central data station and to a first data transmission control unit adapted to the data transmission method, the first connector units connected via a controllable selection switch to a second data transmission control unit adapted to the same data transmission method, each of the first and second data transmission control units connected to a common, serial interface control circuit and to a common clock generator;

and the network node also having a microprocessor unit with an integrated buffer memory connected to the first and second data transmission control units as well as to the serial interface control circuit and to the controllable selection switch.

6. The arrangement according to claim 5, wherein a means for switching is provided for setting different operating conditions of the network node, the means for switching connected at least to the first and second data transmission control units, the serial interface control circuit and the controllable selection switch.

7. The arrangement according to claim 6, wherein the means for switching is manually operable.

8. The arrangement according to claim 6, wherein the means for switching is controllable via the microprocessor unit and connected thereto.

9. Arrangement for transmitting binary coded data between a central data station and a plurality of data terminals in a local area network, whereby the data transmission occurs with a standardized data transmission procedure wherein at least the address of at least one data terminal of the plurality of data terminals is contained in the transmitted data and every data terminal only transmits data after being called by the central data station, and whereby the data transmission also occurs with a predetermined data transmission method from the group of base band transmission methods, comprising a switchable network node which uses the same data transmission method both in the direction toward the central data station as well as in the direction toward the data terminals; the network node having a set of first connector units that prevent any occurrence of modulation products in a transmission direction and that shapes pulses and suppresses noise signals in a reception direction, said first connector units respectively connected to the plurality of data terminals, the network node also having a second connector unit connected to the central data station and to a first data transmission control unit adapted to the data transmission method, the first connector units connected via a controllable selection switch to a second data transmission control unit adapted to the same data transmission method, each of the first and second data transmission control units connected to a common, serial interface control circuit and to a common clock generator; and the network node also having a microprocessor unit with an integrated buffer memory connected to the first and second data transmission control units as well as to the serial interface control circuit and to the controllable selection switch.

10. The arrangement according to claim 9, wherein a means for switching is provided for setting different operating conditions of the network node, the means for switching connected at least to the first and second data transmission control units, the serial interface control circuit and the controllable selection switch.

11. The arrangement according to claim 10, wherein the means for switching is manually operable.

12. The arrangement according to claim 10, wherein the means for switching is controllable via the microprocessor unit and connected thereto.

* * * * *